US009972000B2

(12) United States Patent
Brown

(10) Patent No.: US 9,972,000 B2
(45) Date of Patent: May 15, 2018

(54) REMOTE DOCUMENT GENERATION

(71) Applicant: INTERNATIONAL BUSINESS MACHINES CORPORATION, Armonk, NY (US)

(72) Inventor: Michael Sean Brown, Wahroonga (AU)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 14/553,014

(22) Filed: Nov. 25, 2014

(65) Prior Publication Data

US 2016/0148180 A1 May 26, 2016

(51) Int. Cl.
G06Q 20/14 (2012.01)
G06F 17/22 (2006.01)
H04L 29/08 (2006.01)
G06F 17/24 (2006.01)

(52) U.S. Cl.
CPC ....... *G06Q 20/145* (2013.01); *G06F 17/2247* (2013.01); *G06F 17/24* (2013.01); *G06F 17/246* (2013.01); *H04L 67/02* (2013.01)

(58) Field of Classification Search
CPC .............. G06F 17/30569; G06F 17/24; G06F 2217/02; G06F 17/2247; G06F 17/246; G06Q 20/145; H04L 67/02
See application file for complete search history.

(56) References Cited

U.S. PATENT DOCUMENTS

| 5,420,974 A | * | 5/1995 | Morris | ................ G06F 17/243 715/236 |
| 5,845,283 A | * | 12/1998 | Williams | .......... G06F 17/30569 |
| 6,026,416 A |   | 2/2000 | Kanerva et al. | |
| 6,041,205 A | * | 3/2000 | Funada | ............ G03G 15/04018 382/286 |

(Continued)

FOREIGN PATENT DOCUMENTS

| JP | 08314909 | 11/1996 |
| JP | 2010067094 | 3/2010 |
| WO | 2005029353 | 3/2005 |

OTHER PUBLICATIONS

Wikipedia; Object Linking and Embedding [online]; retrieved from the Internet on Aug. 29, 2014; URL: http://en.wikipedia.org/wiki/Object_Linkgin_and_Embedding; 10 pages.

*Primary Examiner* — Laurie A Ries
*Assistant Examiner* — Brian Garmon
(74) *Attorney, Agent, or Firm* — Schmeiser, Olsen & Watts; John Pivnichny

(57) ABSTRACT

A method and system for generating a document is provided. The method includes generating a metadocument configured to retain multiple components of different data types. A component editor directory of a component editor server is queried and a list of component editors compatible with metadocument is retrieved. A first component editor of the list of component editors is selected from a remote location. The first component editor is associated with a first defined data type. A first document component comprising the first (Continued)

defined data type is generated within the metadocument resulting in a single document comprising the first document component. A user interface is updated with the single document comprising the first document component.

20 Claims, 11 Drawing Sheets

(56) References Cited

U.S. PATENT DOCUMENTS

| | | | | | |
|---|---|---|---|---|---|
| 6,061,696 | A | * | 5/2000 | Lee | G06F 17/211 |
| | | | | | 715/209 |
| 6,308,188 | B1 | * | 10/2001 | Bernardo | G06F 17/211 |
| | | | | | 707/E17.112 |
| 6,732,332 | B1 | * | 5/2004 | Borysewicz | G06F 17/218 |
| | | | | | 707/999.102 |
| 7,484,183 | B2 | * | 1/2009 | Look | G06F 3/0481 |
| | | | | | 715/773 |
| 7,665,017 | B2 | | 2/2010 | Hearn et al. | |
| 2002/0105546 | A1 | * | 8/2002 | Kuntz | G06F 9/4443 |
| | | | | | 715/762 |
| 2012/0297311 | A1 | * | 11/2012 | Duggal | G06F 9/468 |
| | | | | | 715/740 |

* cited by examiner

REMOTE DOCUMENT GENERATION

FIELD

The present invention relates generally to a method for remotely generating documents and in particular to a method and associated system for generating a document comprising multiple remotely accessed components of differing data types.

BACKGROUND

Current software products are moving to a cloud based architecture. A typical software product may be executed from an application and file format point of view. A current move to XML based files, sophisticated web browsers, and increasing access to high speed Internet has enabled cloud based alternatives to become more commonly used. Additionally, a cloud based application model removes the complexities of local file storage and comprises multiple collaboration features.

However, under a modern cloud based system today, when a user creates a new document he or she must choose from a specific document type such as, inter alia, a specified document, a spreadsheet, a word processing document, a presentation, a drawing, an email etc. Selecting from a specific document type causes a user to conform to a restrictive single document format instead of enabling freeform creative work. For example, if a word processing document was created but a user would like to insert a table, powerful features of spreadsheet formulas may be missing due to a single document format. Likewise, if a user would like to insert a picture, only rudimentary graphic tools may be available.

As a further constraint to an end user, selection of a set of tools from a single vendor may cause a combination of powerful software tools to become unavailable as each vendor may generate products comprising differing strengths and weaknesses.

Furthermore, software products are typically required to be installed on an end user system in order to create a document comprising multiple formats.

Accordingly, there exists a need in the art to overcome at least some of the deficiencies and limitations described herein above.

SUMMARY

A first aspect of the invention provides a document generation method comprising: generating, by a computer processor of a metadocument server in response to a user request for generating a new document with respect to a client device, a metadocument configured to retain multiple components of different data types; querying, by the computer processor, a component editor directory of a component editor server; retrieving, by the computer processor, a list of component editors compatible with the metadocument, wherein the list comprises pricing data and functionality data associated with the component editors; retrieving, by the computer processor from a remote location, a first component editor of the list of component editors, the first component editor associated with a first defined data type; generating within the metadocument, by the computer processor, a first document component comprising the first defined data type resulting in a single document comprising the first document component; and updating within the client device, by the computer processor, a user interface with the single document comprising the first document component.

A second aspect of the invention provides a metadocument server comprising a computer processor coupled to a computer-readable memory unit, the memory unit comprising instructions that when executed by the computer processor implements a document generation method comprising: generating, by the computer processor in response to a user request for generating a new document with respect to a client device, a metadocument configured to retain multiple components of different data types; querying, by the computer processor, a component editor directory of a component editor server; retrieving, by the computer processor, a list of component editors compatible with the metadocument, wherein the list comprises pricing data and functionality data associated with the component editors; retrieving, by the computer processor from a remote location, a first component editor of the list of component editors, the first component editor associated with a first defined data type; generating within the metadocument, by the computer processor, a first document component comprising the first defined data type resulting in a single document comprising the first document component; and updating within the client device, by the computer processor, a user interface with the single document comprising the first document component.

A third aspect of the invention provides a computer program product, comprising a computer readable hardware storage device storing a computer readable program code, the computer readable program code comprising an algorithm that when executed by a computer processor of a metadocument server implements a method, the method comprising: generating, by the computer processor in response to a user request for generating a new document with respect to a client device, a metadocument configured to retain multiple components of different data types; querying, by the computer processor, a component editor directory of a component editor server; retrieving, by the computer processor, a list of component editors compatible with the metadocument, wherein the list comprises pricing data and functionality data associated with the component editors; retrieving, by the computer processor from a remote location, a first component editor of the list of component editors, the first component editor associated with a first defined data type; generating within the metadocument, by the computer processor, a first document component comprising the first defined data type resulting in a single document comprising the first document component; and updating within the client device, by the computer processor, a user interface with the single document comprising the first document component.

The present invention advantageously provides a simple method and associated system capable of generating a document comprising multiple components of differing data types.

DETAILED DESCRIPTION

Figure 1:
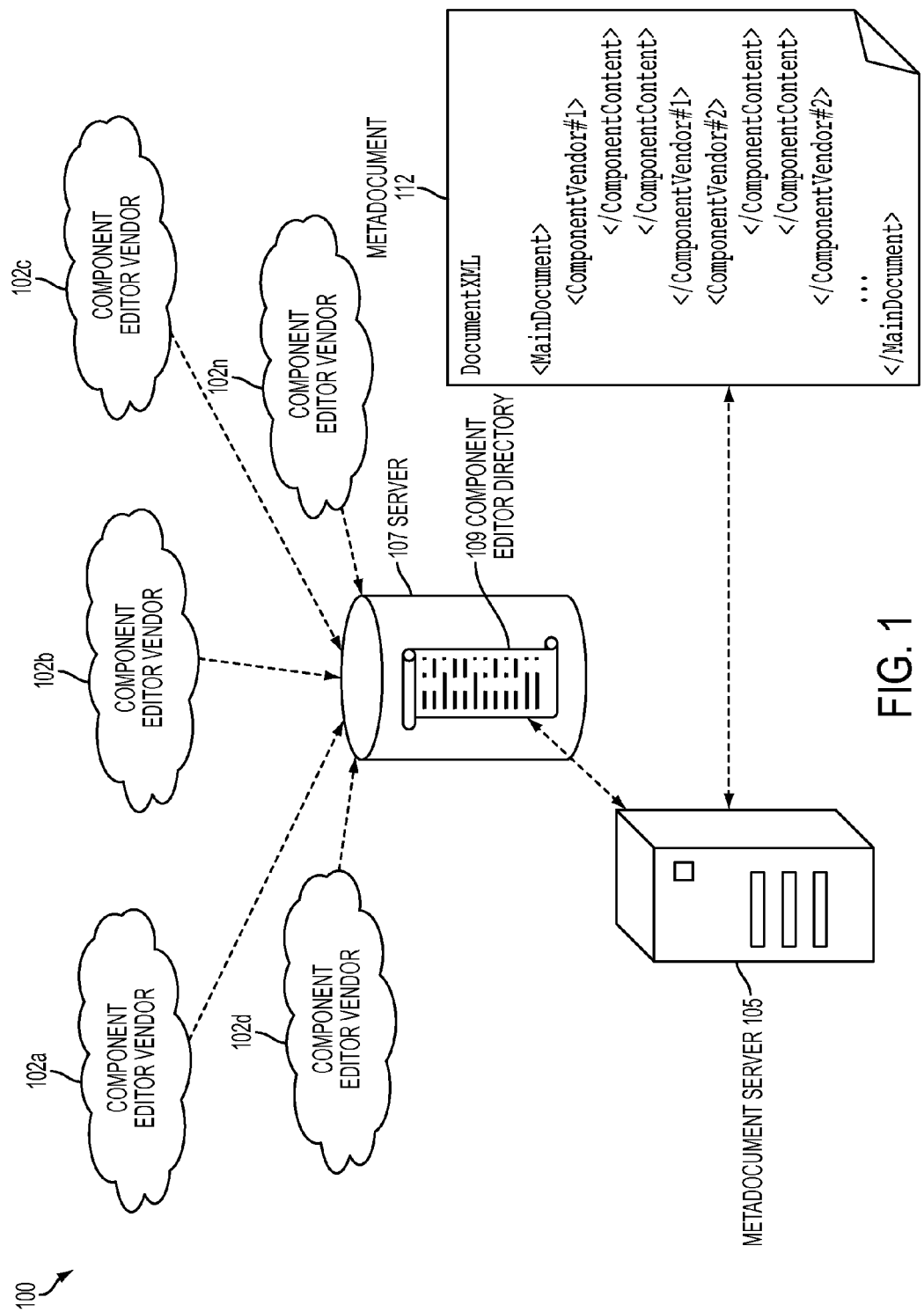
FIG. 1 illustrates a system for allowing users to access differing content components serviced by different cloud based application vendors in real-time, in accordance with embodiments of the present invention.

FIG. 1 illustrates a system 100 for allowing users to access differing content components serviced by different cloud based application vendors in real-time, in accordance with embodiments of the present invention. System 100 enables a method for allowing a user to generate a single blank meta-document comprising generic format. System 100 enables access to different content components serviced by different cloud based application vendors in real-time. System 100 provides the following features:
1. Allowing a user to switch and/or disconnect a component from a cloud from a particular vendor at any time during editing of a meta-document based on user preferences.
2. Providing a usage based payment scheme allowing application vendors to monetize toolsets thereby allowing users to pay by use for each specific component.

In a typical document generation process, a document is required to allow only specified features of differing document types to be included within a single specified document type. For example, if a user copies a graphic into a word processor, basic changes to the graphic may be implemented such as, resizing, generating a border etc. Major photo editing functions for the graphic may not be available (e.g., grouping/ungrouping functions, color correction, light optimization, etc.). Additionally, software products are typically required to be installed on an end user system in order to create a document (or any type of file) comprising multiple formats. System 100 allows metadocument creation without limiting the user to specified data component types and/or specific end user system installed applications.

System 100 enables a series of remote cloud based applications from multiple providers. For example, a metadocument is opened in response to a graphic generation command from a user. System 100 accesses the Internet and requests software to assist with editing the graphic within the metadocument. In response, various software providers present various graphic editing choices (and associated costs) associated with differing component types comprising differing data types.

System 100 of FIG. 1 includes remote cloud based software component editors 102a . . . 102n (associated with components of differing data types and differing component editor vendors) connected through a server 107 to a metadocument server 105. Server 107 comprises a component editor directory 109 associated with software component editors 102a . . . 102n. Metadocument server 105 is configured to generate a metadocument 112. System 100 illustrates a specified the architecture enabling component editor vendors (associated with software component editors 102a . . . 102n) to register services and pricing/subscription data with server 107 comprising component editor directory 109. System 100 allows metadocument 112 to be created (by metadocument server 105) by querying the component editor directory 109 for available services (associated with components) and pricing/subscription information. System 100 provides a method for a user to create a single blank meta-document of a generic format thereby allowing different types of content (comprising differing content components) to be created within the single document. Each content component may be serviced by a different cloud based application vendor in real-time. Furthermore, a user may disconnect any component from a specific vendor at any time. Additionally, a user may switch editing responsibilities to a different vendor based on preferences such as, inter alia, tool capabilities or cost. A usage based payment scheme may be provided to allowing application vendors to monetize tool sets thereby allowing a user to pay by use for each specific component (or tool) without having to pay for components that are not needed or used infrequently.

A user creates a document via a multi-vendor document host. This could be a cloud based service or a software service running on the user's computer or mobile device. In order to generate a document comprising differing data types, Server 107 (e.g., a host) contacts server 107 (e.g., a directory server) and returns a list (e.g., component editor directory 109) of application component vendors in combination with associated advertised services and pricing structure. In response, a user may begin to create content by selecting an advertised service and inserting a specified component into the document. Additionally, the user may return to server 107 at any time to add new components or remove components that are no longer required.

Figure 2:
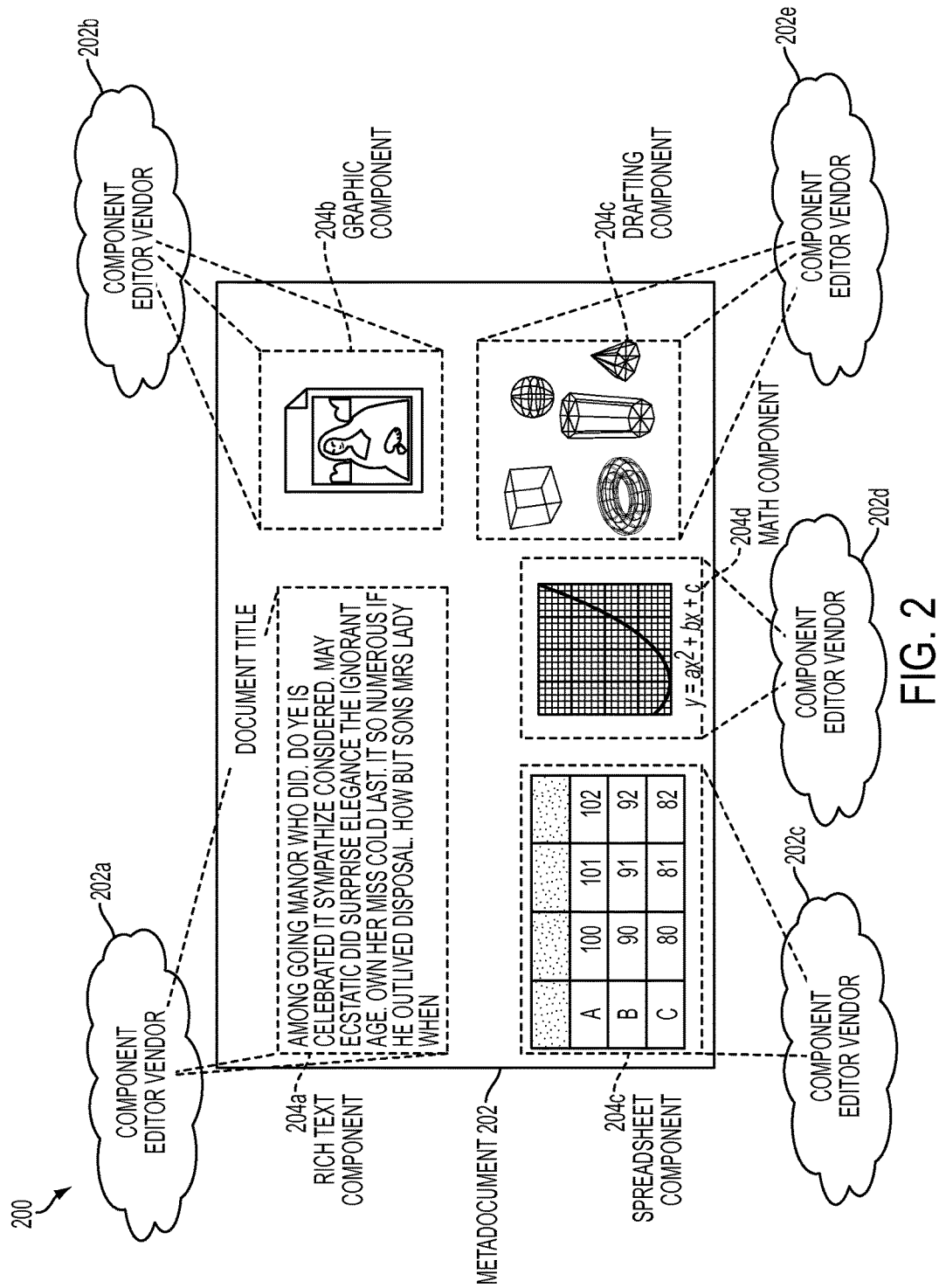
FIG. 2 illustrates an implementation example comprising a metadocument including multiple document components being provided by differing remote cloud based software vendors associated with software component editors, in accordance with embodiments of the present invention.

FIG. 2 illustrates an implementation example comprising a metadocument 212 including multiple document components 204a . . . 204e being provided by differing remote cloud based software vendors associated with software component editors 202a . . . 202e, in accordance with embodiments of the present invention. System 100 enables a method for enabling a user to select specified word processing and spreadsheet vendors associated with document components 204a and 204c. Additionally, the user is able to use a service such as a professional graphic editor (associated with document component 204b) to enhance photos and drafting or mathematics programs (associated with document components 204d and 204e) to work on technical illustrations within a same document. The user is not required to install full application packages on his/her end user system (e.g., laptop) and may select differing component vendors based on required features and pricing criteria.

System 100 illustrates an overall view of metadocument 212 comprising differing document components 204a . . . 204e. System 100 illustrates differing branded component editor vendors providing services within a single document. Document components may be stored as follows:
1. Remotely on component providers cloud systems thereby allowing a document to be fully editable when all the component providers are contactable.

2. A fixed render of components provided before a component provider is disconnected thereby allowing viewing of destructive edits with limited editing capabilities.

3. An encapsulated XML (or other format) data file stored in or with meta-document 212 on the users meta-document server (locally or cloud based) thereby allowing a degree of autonomy from the provider. The encapsulated XML allows open standard document formats to be selected such that a different component provider may be used at a later date thereby allowing users and companies to fully break away from lock-in marketing forcing the user to buy a complete suite of office applications limited to feature set provided.

Figure 3:
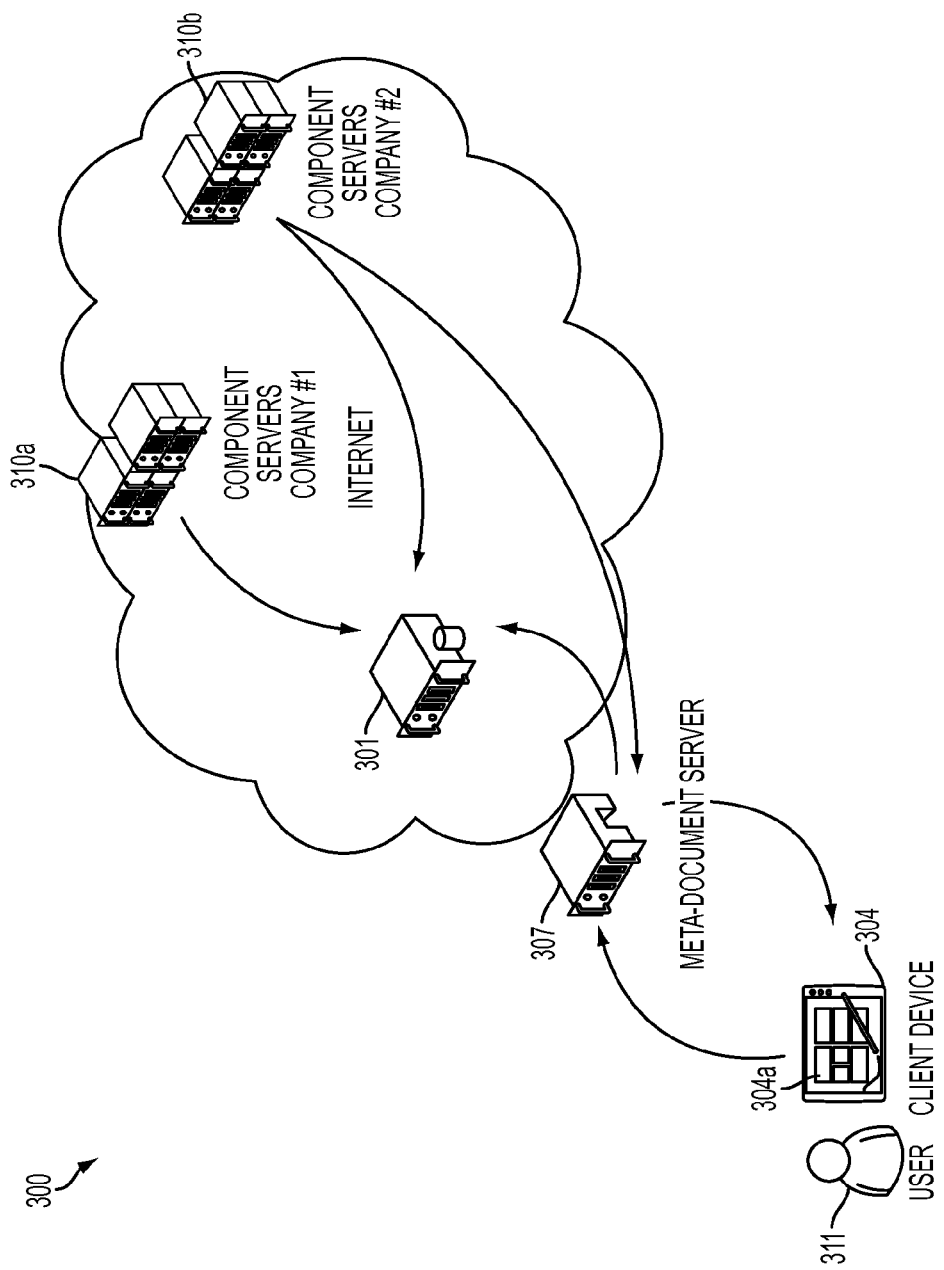
FIG. 3 illustrates a system flow illustrating architectural components represented as physical computing devices, in accordance with embodiments of the present invention.

FIG. 3 illustrates a system flow 300 illustrating architectural components represented as physical computing devices, in accordance with embodiments of the present invention. System flow 300 illustrates component servers 310a and 310b (i.e., component editor vendors) registering with the component editor directory server 301. An end user 311 uses a client device 304 to create a metadocument, query component editor directory server 301 (for a list of document component editors), and engage a specific component editor (of component servers 310a and 310b) via metadocument server 307 thereby updating a user interface 304a and allowing a user 311 to perform document creation and/or editing.

Figure 4:
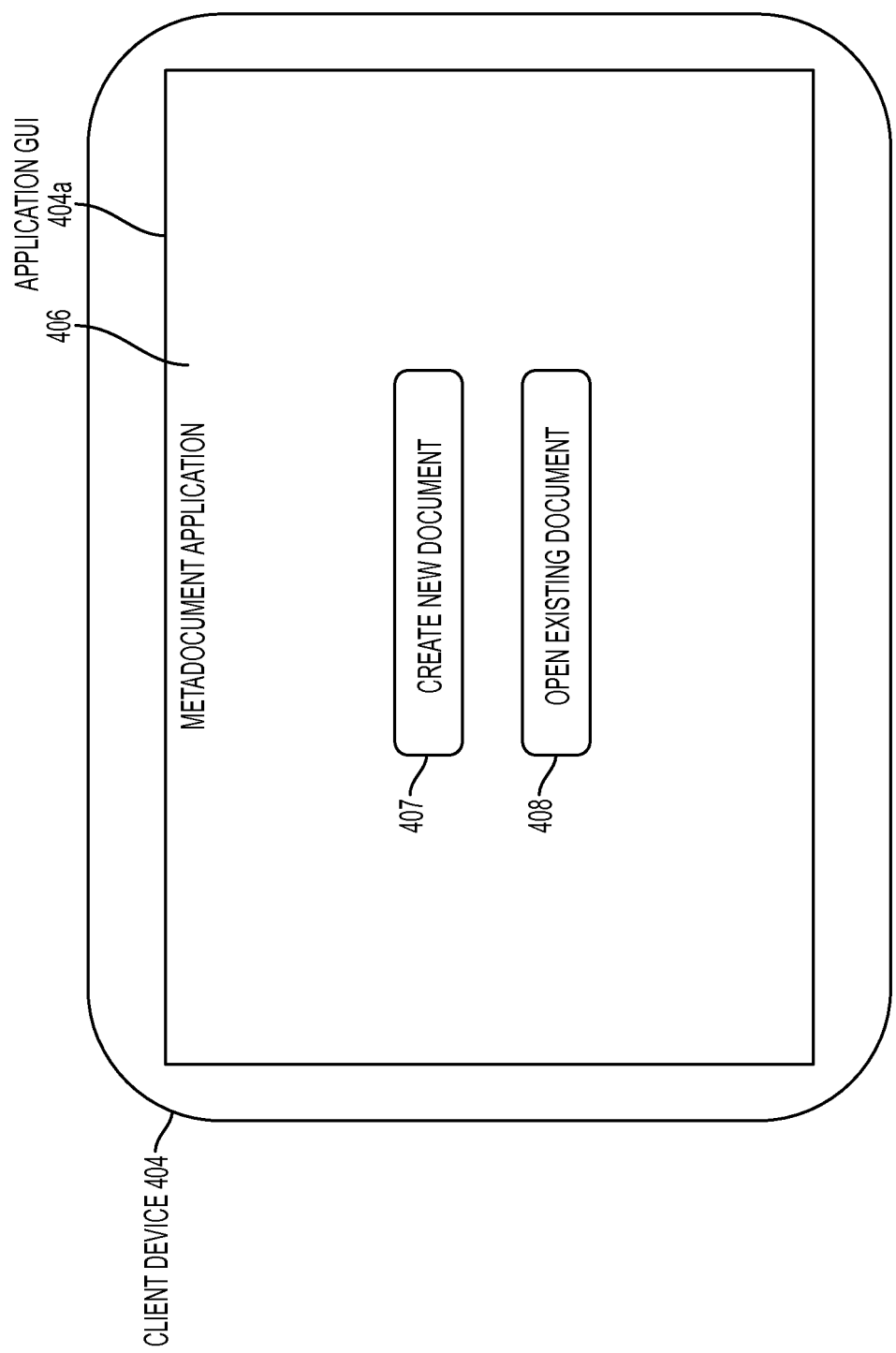
FIG. 4 illustrates a client device, in accordance with embodiments of the present invention.

FIG. 4 illustrates a client device 404, in accordance with embodiments of the present invention. Client device 404 allows an end user to generate or modify metadocument. Client device 404 presents a metadocument application 406 via a GUI 404a. GUI 404a enables a user to create a new document via GUI switch 407. Alternatively, GUI 404a enables a user to open an existing document via GUI switch 408.

Figure 5:
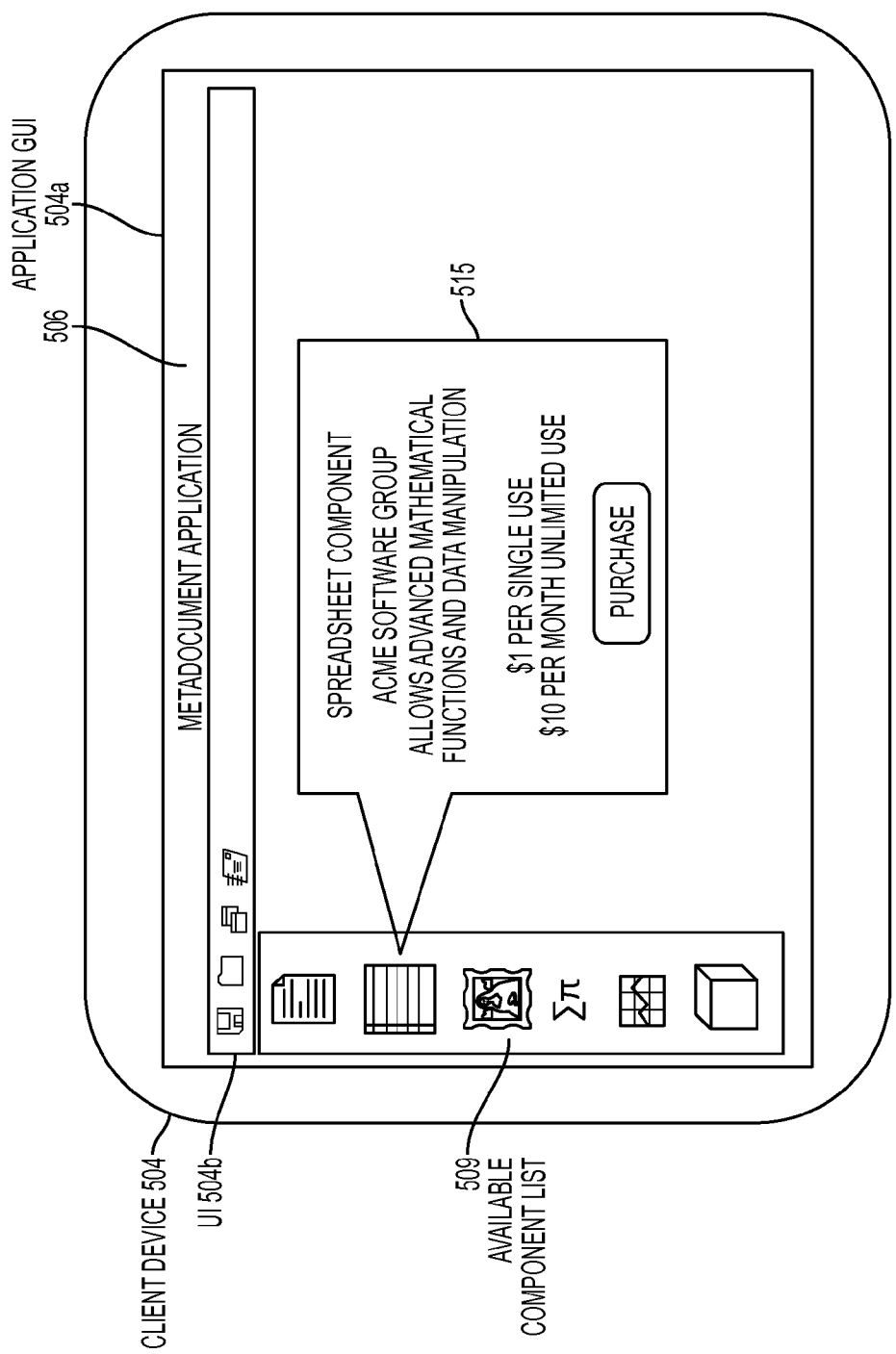
FIG. 5 illustrates an alternative client device, in accordance with embodiments of the present invention.

FIG. 5 illustrates a client device 504, in accordance with embodiments of the present invention. Client device 504 illustrates an example associated with a component editor directory server that has been queried and a list of available components 509 are displayed on a GUI 504a. Pricing/subscription information may be provided for each service via description box 515. UI 504b allows a user to perform I/O functions such as, inter alia, a save function, an email function, etc.

Figure 6:
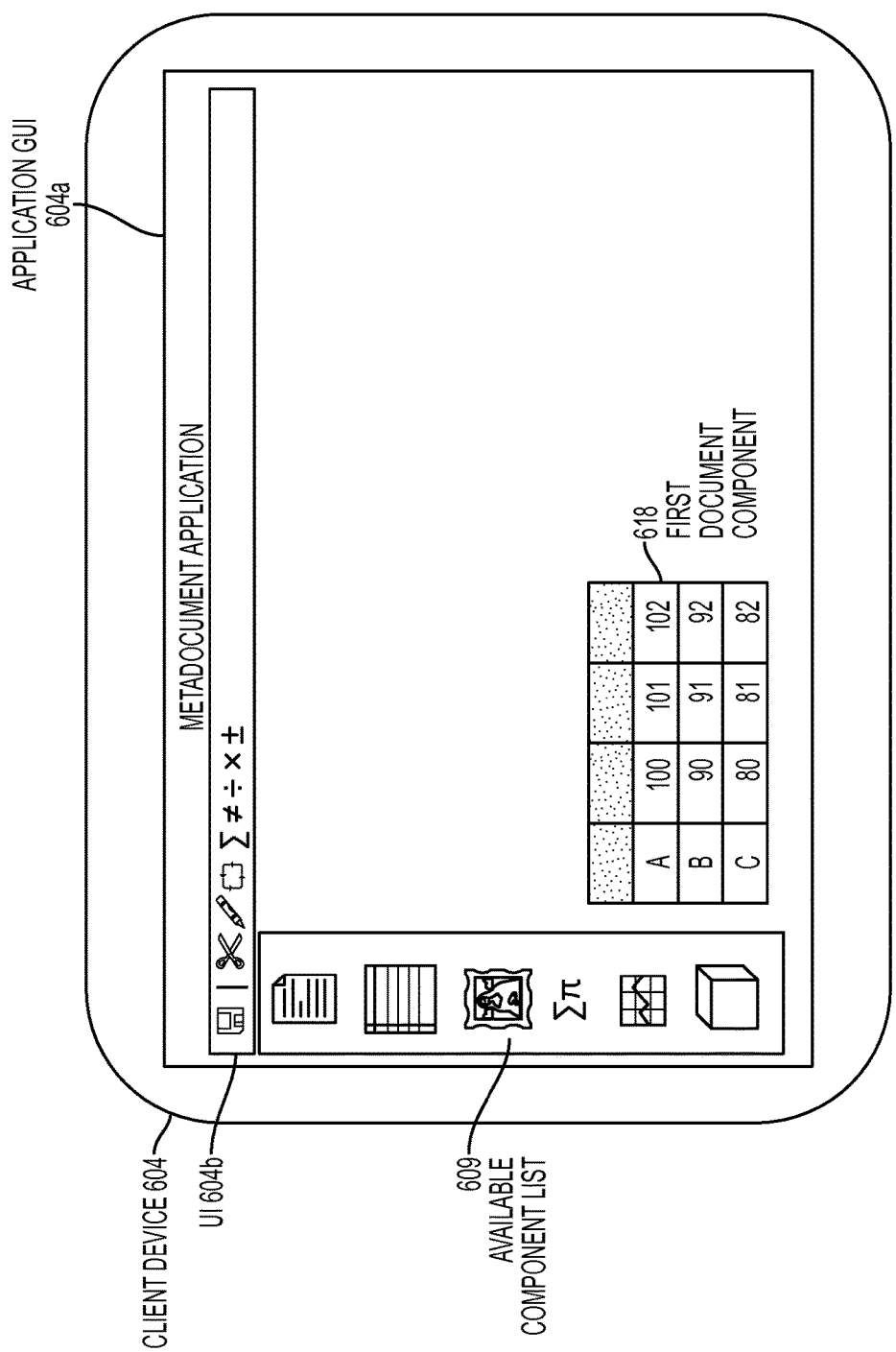
FIG. 6 illustrates an alternative client device, in accordance with embodiments of the present invention.

FIG. 6 illustrates a client device 604, in accordance with embodiments of the present invention. Client device 604 illustrates an example associated with a spreadsheet component editor that has been selected and a spreadsheet component 618 has been created and presented via GUI 604a. A list of available components 609 are displayed on a GUI 604a. UI 604b comprises a custom generated UI to allow a user to facilitate editing spreadsheet functions associated with spreadsheet component 618.

Figure 7:
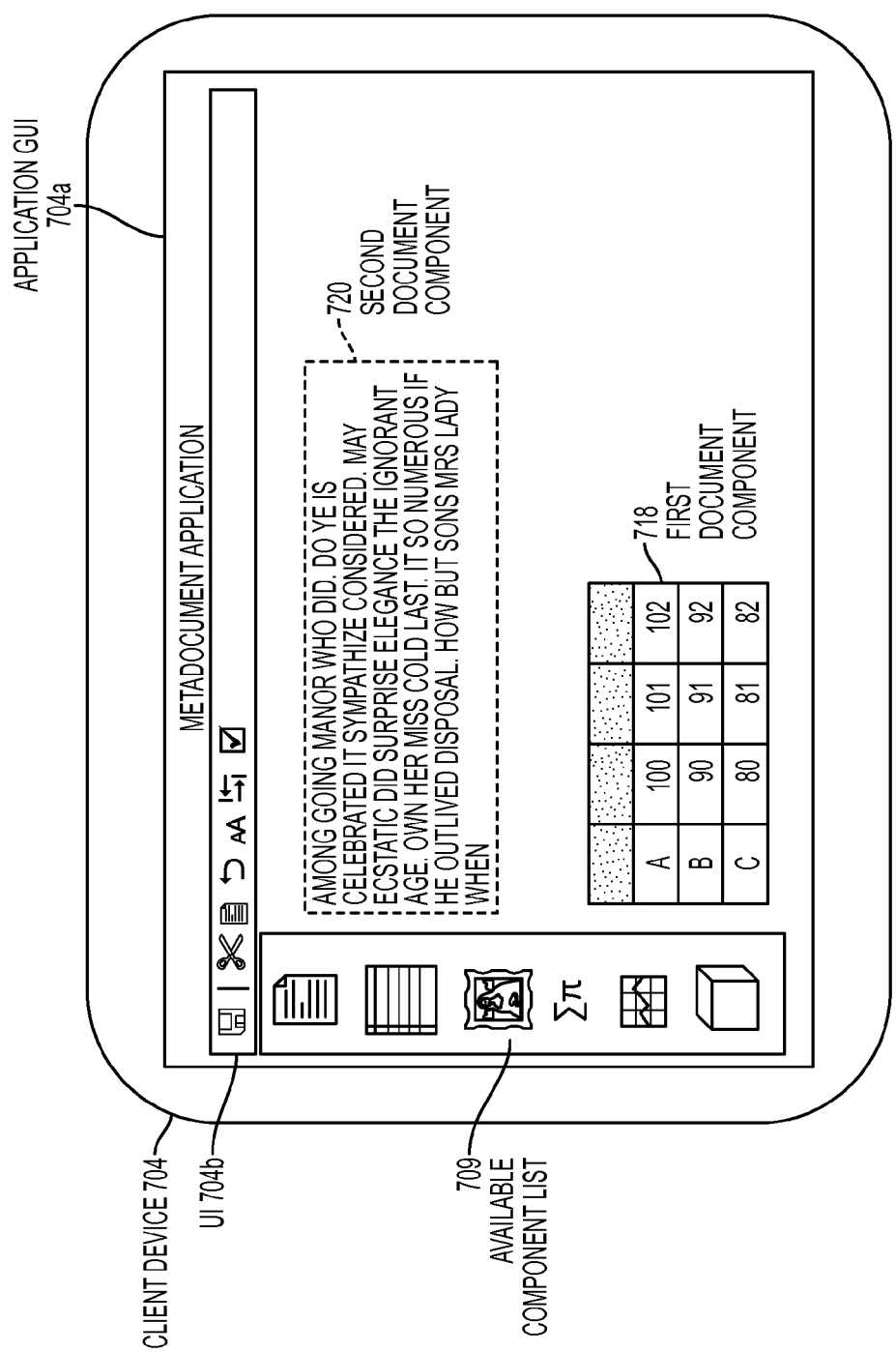
FIG. 7 illustrates an alternative client device, in accordance with embodiments of the present invention.

FIG. 7 illustrates a client device 704, in accordance with embodiments of the present invention. Client device 704 illustrates an example associated with a spreadsheet component editor that has been selected and a spreadsheet component 618 has been created and presented via GUI 604a. Additionally, client device 704 illustrates an example associated with a text editor/word processing component 720 that has been used to create and present a block of text. A list of available components 709 are displayed on a GUI 704a. UI 704b comprises a custom generated UI to allow a user to facilitate editing spreadsheet functions associated with spreadsheet component 618 and word processing functions associated with editor/word processing component 720.

Figure 8:
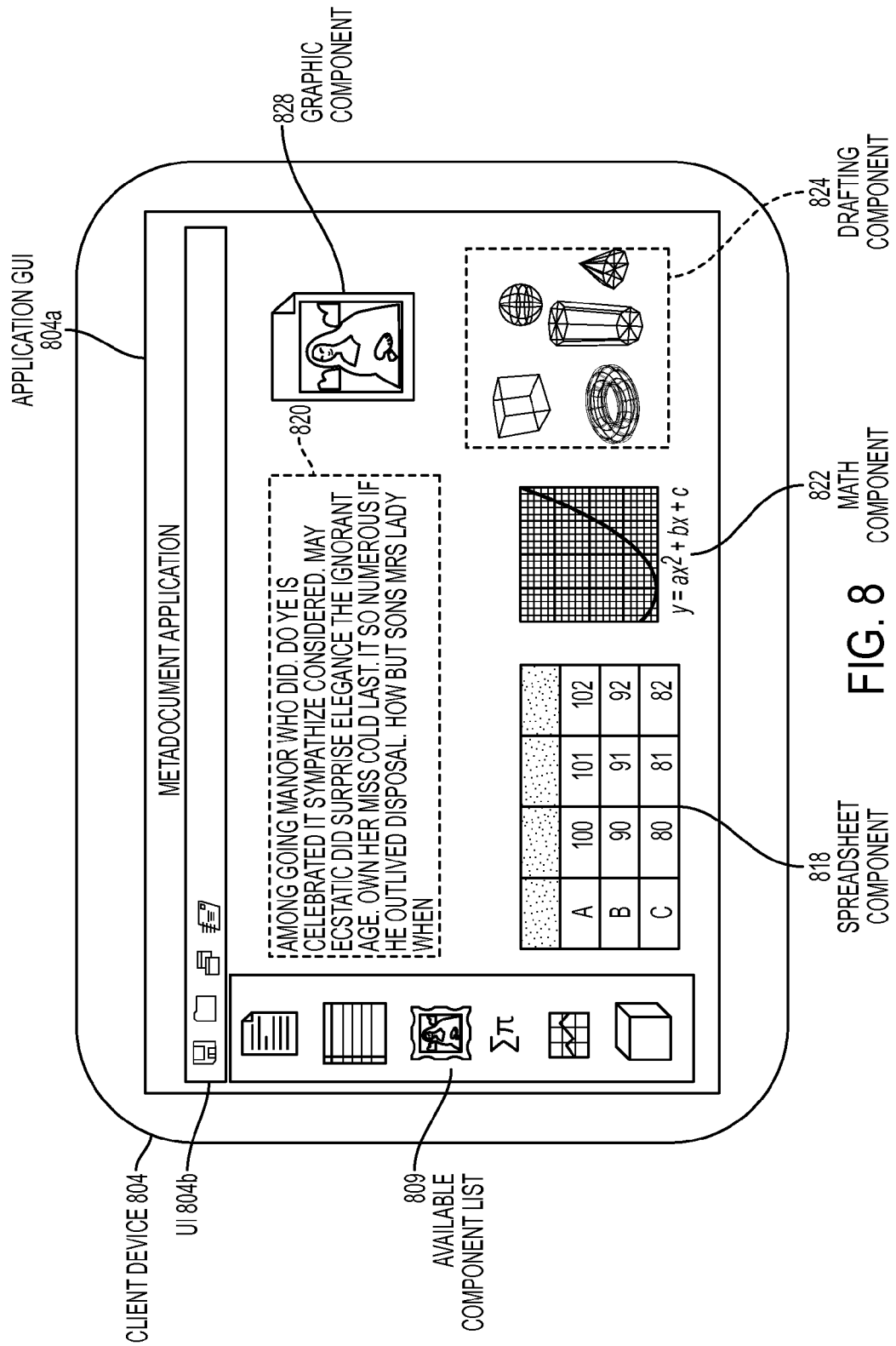
FIG. 8 illustrates an alternative client device, in accordance with embodiments of the present invention.

FIG. 8 illustrates a client device 804, in accordance with embodiments of the present invention. Client device 804 illustrates an example associated with a spreadsheet component editor that has been selected and a spreadsheet component 818 has been created and presented via GUI 804a. Additionally, client device 804 illustrates an example associated with a text editor/word processing component 820 that has been used to create and present a block of text, a math component 822 that has been used to create and present a function/graph, a drafting component 824 that has been used to create and present shapes, and a graphic component 828 that has been used to create and present a picture. A list of available components 809 are displayed on GUI 804a. UI 804b comprises a custom generated UI to allow a user to facilitate editing spreadsheet functions associated with spreadsheet component 718, word processing functions associated with editor/word processing component 820, and functions associated with math component 822, drafting component 824, and graphic component 828.

Figure 9A:
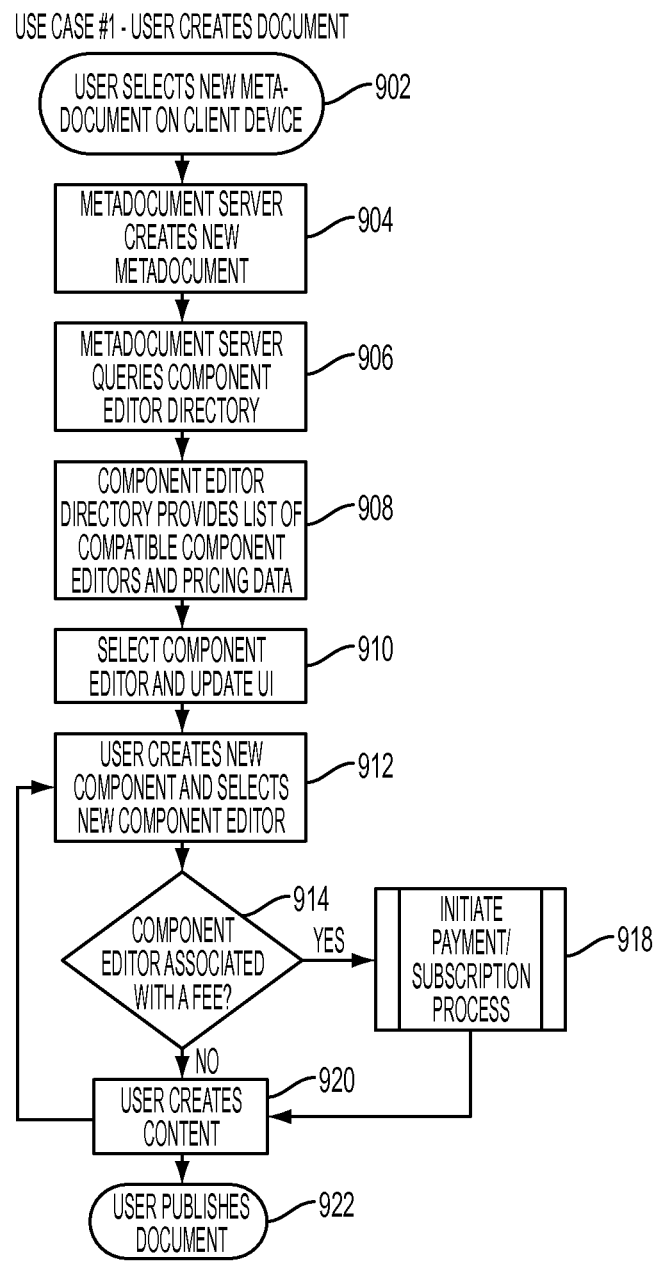
FIG. 9A illustrates a flowchart detailing a document generation process enabled by the system of FIG. 1, in accordance with embodiments of the present invention.

FIG. 9A illustrates a flowchart detailing a document generation process enabled by system 100 of FIG. 1, in accordance with embodiments of the present invention. In step 902, a user selects (via a client device through a metadocument server) a new metadocument to create a new document on the client device. In step 904, the metadocument server generates a new metadocument. In step 906, the metadocument server queries a component editor server for a list of available/compatible component editors. In step 908, the component editor server returns a list of available component editors with functionality and pricing data. In step 910, the user selects a specific component editor from the list and updates a user interface, accordingly. In step 912, the metadocument server selects a new component editor (remotely or from a cloud) and creates a new document component within the metadocument. In step 914, it is determined if the component editor is associated with a fee. If the component editor is associated with a fee then in step 918, a subscription/payment process is executed and in step 920, the user creates content and the component editor updates the user interface on the client device. In step 922, the user publishes the new content via the updated user interface. If the component editor is not associated with a fee then steps 920 and 922 are executed as described, supra.

Figure 9B:
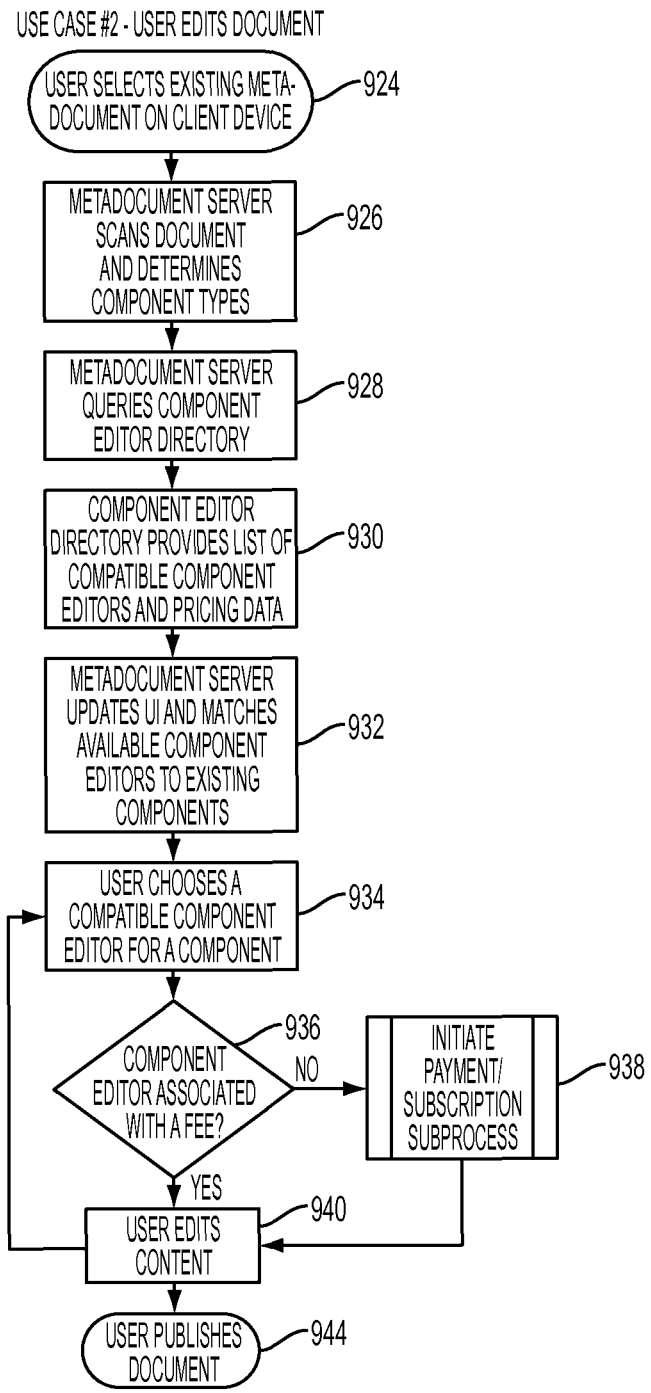
FIG. 9B illustrates a flowchart detailing a document editing process enabled by system of FIG. 1, in accordance with embodiments of the present invention.

FIG. 9B illustrates a flowchart detailing a document editing process enabled by system 100 of FIG. 1, in accordance with embodiments of the present invention. In step 924, a user selects (via a client device through a metadocument server) an existing metadocument to edit a document on the client device. In step 926, the metadocument server scans the existing metadocument and determines existing component types. In step 928, the metadocument server queries a component editor server for a list of available/compatible component editors. In step 930, the component editor server returns a list of available component editors with functionality and pricing data. In step 932, the metadocument server updates a user interface and matches available component editors with the existing component types. In step 934, the metadocument server selects a compatible component editor (remotely or from a cloud) and creates a document component within the metadocument. In step 936, it is determined if the component editor is associated with a fee. If the component editor is associated with a fee then in step 938, a subscription/payment process is executed and in step 940, the component editor updates the user interface on the client device and the user edits the content. In step 922, the user publishes the edited content via the updated user interface. If the component editor is not associated with a fee then steps 940 and 944 are executed as described, supra.

Figure 10:
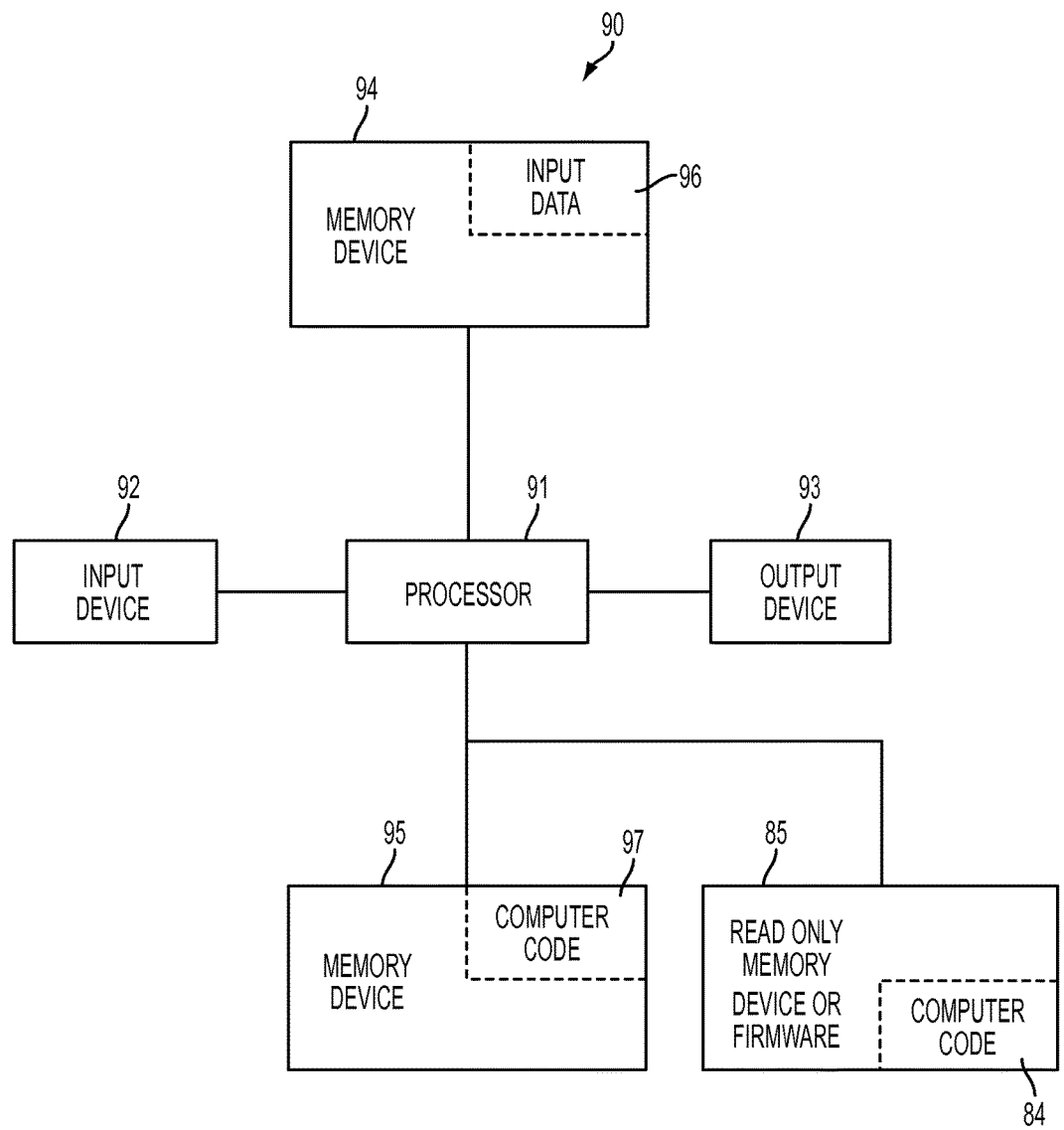
FIG. 10 illustrates a computer system used by the system of FIG. 1 for allowing users to access differing content components serviced by different cloud based application vendors in real-time, in accordance with embodiments of the present invention.

FIG. 10 illustrates a computer system 90 (e.g., server 105 and/or 107 of FIG. 1) for allowing users to access differing content components serviced by different cloud based application vendors in real-time, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 10 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 9A and 9B) for allowing users to access differing content components serviced by different cloud based application vendors in real-time. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include the algorithms of FIGS. 9A and 9B and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithms of FIGS. 9A and 9B) may be stored on a static, nonremovable, read-only storage medium such as a Read-Only Memory (ROM) device 85, or may be accessed by processor 103 directly from such a static, nonremovable, read-only medium 85. Similarly, in some embodiments, stored computer program code 84 may be stored as computer-readable firmware 85, or may be accessed by processor 103 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to allow users to access differing content components serviced by different cloud based application vendors in real-time. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for allowing users to access differing content components serviced by different cloud based application vendors in real-time. In another embodiment, the invention provides a business method that performs the process steps of the invention on a subscription, advertising, and/or fee basis. That is, a service supplier, such as a Solution Integrator, could offer to allow users to access differing content components serviced by different cloud based application vendors in real-time. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 10 shows the computer system 90 as a particular configuration of hardware and software, any configuration of hardware and software, as would be known to a person of ordinary skill in the art, may be utilized for the purposes stated supra in conjunction with the particular computer system 90 of FIG. 10. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A document generation method comprising:
generating, by a computer processor of a metadocument server in response to a user request for generating a new document with respect to a client device, a metadocument configured to retain multiple software components of different data types;
querying, by said computer processor, a component editor directory of a component editor server;
retrieving, by said computer processor from a remote location, a list of component editors compatible with said metadocument, wherein said list comprises pricing data and functionality data associated with said component editors;
connecting to said metadocument server via a server, by said computer processor, a first component editor of said list of component editors;
servicing in real time, by said computer processor executing a cloud based application, said first component editor;
retrieving, by said computer processor via an encapsulated XML datafile, said first component editor of said list of component editors, said first component editor associated with a first defined data type;
presenting to said user, by said processor via a software application graphical user interface (GUI), a list of remotely located available document software components;
retrieving, by said processor, a first document software component of said list of remotely located available document software components;
generating and inserting within said metadocument, by said computer processor, said first document software component comprising said first defined data type resulting in a single document comprising said first document software component executable within said single document;
updating within said client device, by said computer processor, a user interface with said single document comprising said first document software component;
executing, by said computer processor via said user interface, said first document software component within said metadocument resulting in software executed changes within said metadocument; and disconnecting, by said computer processor, said first component editor from said metadocument server.

2. The method of claim 1, further comprising:
retrieving, by said computer processor, a second component editor of said list of component editors, said second component editor associated with said second defined data type;
generating within said single document comprising said first document software component, by said computer processor, a second document software component comprising a second defined data type differing from said first defined data type resulting in said single document comprising said first document software component and said second document software component; and
updating within said client device, by said computer processor, said user interface with said single document comprising said first document software component and said second document software component.

3. The method of claim 2, wherein said inserting said first document software component and said inserting said second document software component are performed sequentially.

4. The method of claim 2, wherein said inserting said first document software component and said inserting said second document software component are performed simultaneously by differing entities in differing locations.

5. The method of claim 2, further comprising:
receiving, by a computer processor, a request for editing said single document comprising said first document software component and said second document software component;
scanning, by said computer processor, said single document comprising said first document software component and said second document software component;
determining, by said computer processor based on results of said scanning, said first defined data type and said second defined data type;
retrieving, by said computer processor, said first component editor of said list of component editors;
removing, by said computer processor executing said first component editor, said first document software component;
retrieving, by said computer processor, a third component editor of said list of component editors, said third component editor associated with said third defined data type;
generating within said single document comprising said second document software component, by said computer processor, a third document software component comprising a third defined data type differing from said second defined data type resulting in said single document comprising said second document software component and said third document software component; and
updating within said client device, by said computer processor, said user interface with said single document comprising said second document software component and said third document software component.

6. The method of claim 1, further comprising:
determining, by said computer processor based on said pricing data, that said first component editor is associated with a specified fee; and
executing, by said computer processor, a payment retrieval process with respect to said specified fee.

7. The method of claim 1, further comprising:
publishing, by said computer processor via said user interface, said single document comprising said first document software component.

8. The method of claim 1, further comprising:
providing at least one support service for at least one of creating, integrating, hosting, maintaining, and deploying computer-readable code in the computing system, said code being executed by the computer processor to implement: said generating said metadocument, said querying, said retrieving said list, said retrieving said first component editor, said generating said first document component, and said updating.

9. A metadocument server comprising a computer processor coupled to a computer-readable memory unit, said memory unit comprising instructions that when executed by the computer processor implements a document generation method comprising:
generating, by said computer processor in response to a user request for generating a new document with respect to a client device, a metadocument configured to retain multiple software components of different data types;
querying, by said computer processor, a component editor directory of a component editor server;
retrieving, by said computer processor from a remote location, a list of component editors compatible with said metadocument, wherein said list comprises pricing data and functionality data associated with said component editors;
connecting to said metadocument server via a server, by said computer processor, a first component editor of said list of component editors;
servicing in real time, by said computer processor executing a cloud based application, said first component editor;
retrieving, by said computer processor via an encapsulated XML datafile, said first component editor of said list of component editors, said first component editor associated with a first defined data type;
presenting to said user, by said processor via a software application graphical user interface (GUI), a list of remotely located available document software components;
retrieving, by said processor, a first document software component of said list of remotely located available document software components;
generating and inserting within said metadocument, by said computer processor, said first document software component comprising said first defined data type resulting in a single document comprising said first document software component executable within said single document;
updating within said client device, by said computer processor, a user interface with said single document comprising said first document software component;
executing, by said computer processor via said user interface, said first document software component within said metadocument resulting in software executed changes within said metadocument; and
disconnecting, by said computer processor, said first component editor from said metadocument server.

10. The metadocument server of claim 9, wherein said method further comprises:
retrieving, by said computer processor, a second component editor of said list of component editors, said second component editor associated with said second defined data type;

generating within said single document comprising said first document software component, by said computer processor, a second document software component comprising a second defined data type differing from said first defined data type resulting in said single document comprising said first document software component and said second document software component; and updating within said client device, by said computer processor, said user interface with said single document comprising said first document software component and said second document software component.

11. The metadocument server of claim 10, wherein said inserting said first document software component and said inserting said second document software component are performed sequentially.

12. The metadocument server of claim 10, wherein said inserting said first document software component and said inserting said second document software component are performed simultaneously by differing entities in differing locations.

13. The metadocument server of claim 10, wherein said method further comprises:

receiving, by a computer processor, a request for editing said single document comprising said first document software component and said second document software component;

scanning, by said computer processor, said single document comprising said first document software component and said second document software component;

determining, by said computer processor based on results of said scanning, said first defined data type and said second defined data type;

retrieving, by said computer processor, said first component editor of said list of component editors;

removing, by said computer processor executing said first component editor, said first document software component;

retrieving, by said computer processor, a third component editor of said list of component editors, said third component editor associated with said third defined data type;

generating within said single document comprising said second document software component, by said computer processor, a third document software component comprising a third defined data type differing from said second defined data type resulting in said single document comprising said second document software component and said third document software component; and updating within said client device, by said computer processor, said user interface with said single document comprising said second document software component and said third document software component.

14. The metadocument server of claim 9, wherein said method further comprises:

determining, by said computer processor based on said pricing data, that said first component editor is associated with a specified fee; and executing, by said computer processor, a payment retrieval process with respect to said specified fee.

15. The metadocument server of claim 9, wherein said method further comprises:

publishing, by said computer processor via said user interface, said single document comprising said first document software component.

16. A computer program product, comprising a computer readable hardware storage device storing a computer readable program code, said computer readable program code comprising an algorithm that when executed by a computer processor of a metadocument server implements a method, said method comprising:

generating, by said computer processor in response to a user request for generating a new document with respect to a client device, a metadocument configured to retain multiple software components of different data types;

querying, by said computer processor, a component editor directory of a component editor server;

retrieving, by said computer processor from a remote location, a list of component editors compatible with said metadocument, wherein said list comprises pricing data and functionality data associated with said component editors;

connecting to said metadocument server via a server, by said computer processor, a first component editor of said list of component editors;

servicing in real time, by said computer processor executing a cloud based application, said first component editor;

retrieving, by said computer processor via an encapsulated XML datafile, said first component editor of said list of component editors, said first component editor associated with a first defined data type;

presenting to said user, by said processor via a software application graphical user interface (GUI), a list of remotely located available document software components;

retrieving, by said processor, a first document software component of said list of remotely located available document software components;

generating and inserting within said metadocument, by said computer processor, said first document software component comprising said first defined data type resulting in a single document comprising said first document software component executable within said single document;

updating within said client device, by said computer processor, a user interface with said single document comprising said first document software component;

executing, by said computer processor via said user interface, said first document software component within said metadocument resulting in software executed changes within said metadocument; and disconnecting, by said computer processor, said first component editor from said metadocument server.

17. The computer program product of claim 16, wherein said method further comprises:

retrieving, by said computer processor, a second component editor of said list of component editors, said second component editor associated with said second defined data type;

generating within said single document comprising said first document software component, by said computer processor, a second document software component comprising a second defined data type differing from said first defined data type resulting in said single document comprising said first document software component and said second document software component; and updating within said client device, by said computer processor, said user interface with said single document comprising said first document software component and said second document software component.

18. The computer program product of claim 17, wherein said inserting said first document software component and said inserting said second document software component are performed sequentially.

19. The computer program product of claim 17, wherein said inserting said first document software component and said inserting said second document software component are performed simultaneously by differing entities in differing locations.

20. The computer program product of claim 17, wherein said method further comprises:
   receiving, by a computer processor, a request for editing said single document comprising said first document software component and said second document software component;
   scanning, by said computer processor, said single document comprising said first document software component and said second document software component;
   determining, by said computer processor based on results of said scanning, said first defined data type and said second defined data type;
   retrieving, by said computer processor, said first component editor of said list of component editors;
   removing, by said computer processor executing said first component editor, said first document software component;
   retrieving, by said computer processor, a third component editor of said list of component editors, said third component editor associated with said third defined data type;
   generating within said single document comprising said second document software component, by said computer processor, a third document software component comprising a third defined data type differing from said second defined data type resulting in said single document comprising said second document software component and said third document software component; and
   updating within said client device, by said computer processor, said user interface with said single document comprising said second document software component and said third document software component.

* * * * *